Oct. 18, 1927.
J. WITTE
1,646,077
GEAR SHIFT LEVER LOCK
Filed April 23, 1926
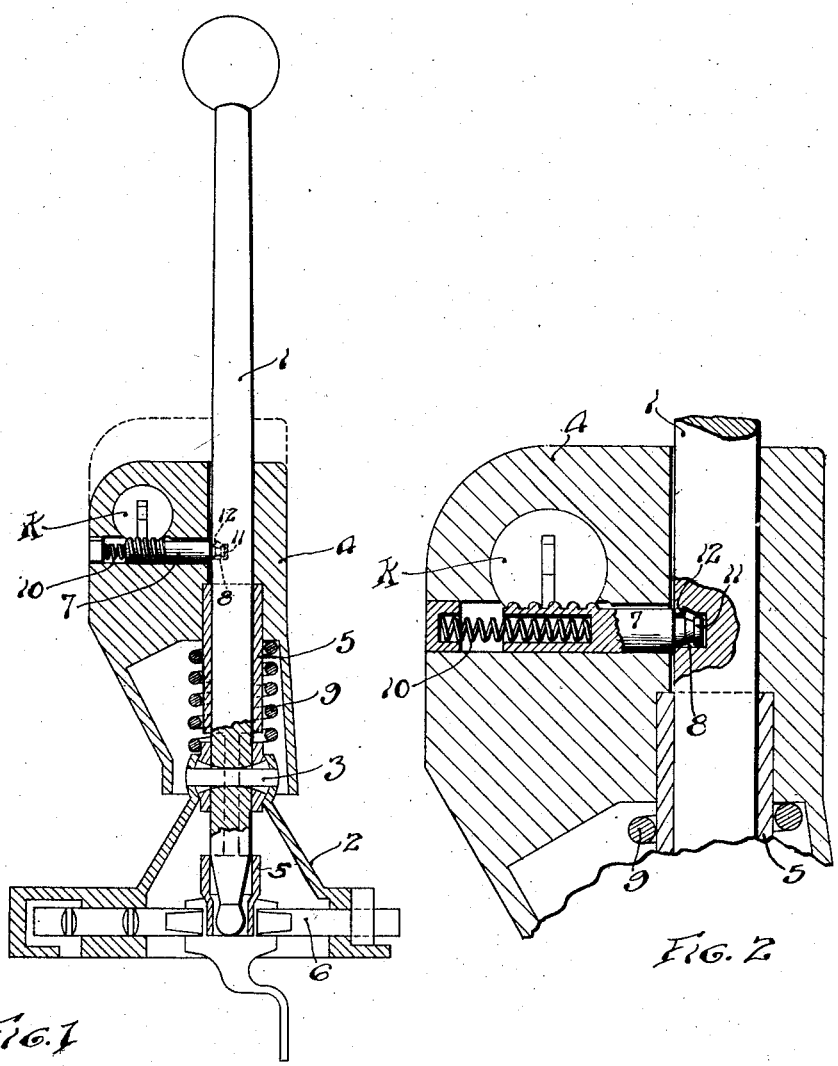
INVENTOR
John Witte Patented Oct. 18, 1927.

1,646,077

UNITED STATES PATENT OFFICE.

JOHN WITTE, OF FERGUSON, MISSOURI.

GEAR-SHIFT-LEVER LOCK.

Application filed April 23, 1926. Serial No. 104,088.

My invention relates to locks and is particularly adapted for use in connection with automobile gear shift lever locks.

In one type of such locks, such as is illustrated in my Patent No. 1,464,859, the shift lever and a locking element have relative movement to each other and are adapted when in a certain position to prevent operation of the shift lever. The lever and element are provided with a key lock for holding them in the position in which the movement of the gear shift lever is prevented.

It has been demonstrated that where there is play between the lever and the lock element it is possible to wiggle the two members, and by a suitable manipulation to gradually disengage the pin or bolt of the key lock from the recess into which it projects.

The object of my present invention is to produce a locking structure in which this disadvantage is eliminated.

In the accompanying drawings which illustrate a selected embodiment of my invention,—

Figure 1 is a vertical section through a lock of the type referred to and showing the gear shift lever and the adjacent shift rods and their casing on which the lever is mounted.

Figure 2 is an enlarged detail of the key lock element and the adjacent portion of the lever which is engaged by the key lock element.

The gear shift lever is shown at 1 as being of a straight cylindrical member and is pivoted on the transmission casing 2 by a ball and socket joint including a pin 3. The lock member includes a block 4 having a sleeve 5 which surrounds the lower portion of the lever and the block may be slid on the lever from the dot-and-dash line position indicated in Figure 1 to the solid line position in which the lower portion of the sleeve 5 enters between the shift rods 6 and by engaging both of these rods prevents the tilting and operation of the shift lever. The block 4 is retained in this position by means of the pin 7 which forms the lock bolt of a key lock indicated generally by the letter K. Bolt 7 enters a suitable recess 8 in the gear shift lever and holds block 4 in its shift rod engaging position. When the key of the lock is turned to retract bolt 7 from its recess in the lever, the spring 9 moves the block upwardly and the lever is then operable. All of the above is set forth and claimed in my above-mentioned patent.

In the manufacture of locks such as described above, there is usually some play between the lever and the block and between the lock bolt and the recesses in the block and in the lever in which the bolt moves. By pulling upwardly on the block and by wiggling the same so as to disalign its axis with the gear shift lever axis and disalign the axis of bolt 7 with the axis of its recess in the gear shift lever, it is possible to frictionally engage opposite sides of the bolt along successive points so as to gradually work the lock bolt out of the recess 8 (notwithstanding the thrust of the bolt spring 10) until the pin is disengaged from the lever, and the block may be moved upwardly into a non-operative position.

To prevent such tampering of the device, I have devised the structure detailed in which the projecting end of bolt 7 has a shoulder 11 formed thereon facing the body of the bolt. Recess 8 in the lever has its wall provided with an oppositely facing shoulder 12. The shoulder in the wall of the recess can be easily formed by an off-center drill adapted for such purpose, or by a small circular saw inserted through the recess entrance and rotated with its axis disaligned from the axis of the recess.

The annular shoulder 11 on pin 7 may extend all about the latter as the pin is frequently round and rotatable. Preferably the shoulder 12 on the recess wall is less than one hundred eighty degrees in extent, thereby lessening the chance of resistance to the withdrawal of the pin by the mechanism of lock K. However, manipulation of the block and lever, as described above, will result in the interengagement of shoulders 11 and 12 and prevent the withdrawal of the pin from the recess. The annular groove on the recess wall could be made continuous if desired and this would not prevent the authorized withdrawal of the pin as the diameter of the end of the pin is less than the diameter of the entrance to the recess. Such construction, however, might necessitate a single shifting of the block and lever so as to align the pin and recess axes when the key is turned to withdraw the bolt.

This and other changes in the details of my invention may be made without departing from the spirit of my invention. While I have described my invention as applied to a particular type of lock, I contemplate the use thereof in connection with locks other than the particular kind described but with which the same objectionable tampering is possible.

I claim:

1. In a device of the class described, a shift lever having a transverse recess, a locking member slidable on said lever and including a lock bolt adapted to enter said recess, and elements on the sides of said recess and bolt normally out of contact with each other but adapted to interengage for impeding movement of said bolt from said recess when said member and said lever are manipulated so as to disalign the axes of said recess and bolt.

2. In a device of the class described, a shift lever having a transverse recess wall element, a lock pin element adapted to enter said recess, lateral recesses in said elements presenting surfaces facing in opposite directions axially of said elements and adapted to interengage only when said elements are moved out of their normal position.

3. In a device of the class described, a lever having a transverse cylindrical recess, a cylindrical lock pin adapted to enter said recess, there being an annular groove in the side wall of said recess and there being an annular groove in the periphery of the portion of said pin which projects into said recess, the diameter of the outer edge of said groove being no greater than the diameter of the lock pin at either side of said groove.

4. In combination, a longitudinal bar having a recess, a block movable on said bar and adapted when in a certain position to hold said bar against operative movement, a key lock in said block including a lock bolt movable into said recess, there being elements on said bar and bolt adapted to engage each other only when said bar and block are tilted to displace said bolt from a normal position in said recess.

5. In combination, a longitudinal bar having a recess, a block movable on said bar and adapted when in a certain position to hold said bar against operative movement, a key lock in said block including a lock bolt movable into said recess, said recess having an inwardly facing shoulder on one side and a smooth surface opposite said shoulder, and said bolt having a shoulder adapted to engage said recess shoulder only when said bolt is tilted and moved longitudinally outwardly of said recess at an angle to the axis of said recess.

In testimony whereof I hereunto affix my signature this 19th day of April, 1926.

JOHN WITTE.